(12) United States Patent
Goad et al.

(10) Patent No.: US 7,456,943 B1
(45) Date of Patent: Nov. 25, 2008

(54) LASER POSITIONING MEASUREMENT SYSTEM AND METHOD

(75) Inventors: Clyde C. Goad, Columbus, OH (US); Vernon Joseph Brabec, Livermore, CA (US); Raymond M. O'Connor, Danville, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 213 days.

(21) Appl. No.: 11/085,848

(22) Filed: Mar. 22, 2005

Related U.S. Application Data

(60) Provisional application No. 60/556,727, filed on Mar. 26, 2004.

(51) Int. Cl.
*G01B 11/26* (2006.01)
(52) U.S. Cl. ............ 356/139.01; 356/3.01; 356/139.04; 342/118
(58) Field of Classification Search ............ 356/139.01, 356/3.01, 139.04
See application file for complete search history.

(56) References Cited

U.S. PATENT DOCUMENTS 6,433,866 B1 * 8/2002 Nichols .................... 356/141.1
6,450,267 B2 * 9/2002 Ohtomo et al. .............. 172/4.5
2004/0125365 A1 * 7/2004 Ohtomo et al. .......... 356/141.5

* cited by examiner

*Primary Examiner*—Thomas H Tarcza
*Assistant Examiner*—Timothy A Brainard
(74) *Attorney, Agent, or Firm*—Weinick & Associates, LLC

(57) ABSTRACT

The position of an apparatus moving along a surface is determined by calculating a plurality of vertical angles between the apparatus and a known location, where the vertical angles vary only within a range having a largest expected maximum angle. A plurality of horizontal distances between the apparatus and the known location are determined, each of the horizontal distances associated with one of the vertical angles. The horizontal distances are computed to within a tolerance based at least in part on the largest expected maximum angle. A plurality of heights of the apparatus are then determined using the plurality of vertical angles and associated horizontal distances. In particular embodiments, the known location may be associated with a rotating laser used with a photodetector at the target to determine the vertical angle. Further, the target may comprise a GPS receiver for use in determining the horizontal distance measurements.

21 Claims, 4 Drawing Sheets

LASER POSITIONING MEASUREMENT SYSTEM AND METHOD

This application claims the benefit of U.S. Provisional Application No. 60/556,727 filed Mar. 26, 2004, which is incorporated herein by reference.

BACKGROUND OF THE INVENTION

The present invention relates generally to laser positioning measurement techniques, and more particularly to laser positioning measurement techniques for use in substantially level landform applications.

There are various types of positioning systems for determining the position of an object. For example, in a global navigation satellite system (GNSS) a navigation receiver receives and processes radio signals transmitted by satellites. Examples of such GNSS systems are the Global Positioning System (GPS) of the United States, the Global Navigation Satellite System (GLONASS) of Russia, and the planned Galileo system of Europe. Generally, the term GPS will be used herein, but it should be recognized that the discussion herein is equally applicable to any type of GNSS.

A GPS receiver measures the time delay of received satellite signals relative to a local reference clock. These measurements enable the receiver to determine the so-called pseudo-ranges between the receiver and the satellites. If the number of satellites is large enough, then the measured pseudo-ranges can be processed to determine the user location and time. The accuracy of the location determination may be increased through the use of various techniques. One such technique is differential navigation (DN) in which the task of finding the user position, also called the rover, is performed relative to a base station at a known location. The base station has a navigation receiver which receives and processes the signals of the satellites to generate measurements. These signal measurements are transmitted to the rover via a communication channel (e.g., wireless). The rover uses these measurements received from the base, along with its own measurements taken with its own navigation receiver, in order to determine its location precisely. The location determination is improved in the differential navigation mode because the rover is able to use the base station measurements in order to compensate for errors in the rover measurements.

The location determination accuracy of differential navigation may be improved further by supplementing the pseudo-range measurements with measurements of the phases of the satellite carrier signals. If the carrier phase of the signal received from a satellite in the base receiver is measured and compared to the carrier phase of the same satellite measured in the rover receiver, measurement accuracy may be obtained to within several percent of the carrier's wavelength.

The above described general scheme of computations is well known in the art and is described in further detail, for example, in, Bradford W. Parkinson and James J. Spilker Jr., *Global Positioning Theory and Applications*, Volume 163 of Progress In Astronautics and Aeronautics, published by the American Institute of Aeronautics and Astronautics, Inc, Washington D.C., 1996. A real-time-kinematic (RTK) GPS system, which utilizes satellite carrier phase in combination with differential navigation techniques is described in U.S. Pat. No. 6,268,824, which is incorporated herein by reference.

The above described navigation techniques result in highly accurate horizontal position measurements. However, one known deficiency in GPS location techniques is a lack of accuracy in vertical position measurements. As such, determining the height of a GPS receiver cannot be determined with the same accuracy as that for the horizontal measurements.

One technique for increasing the accuracy of height calculations is to supplement the GPS calculations with another system. For example, U.S. Patent Application Publication No. US2004/0125365 A1, entitled Working Position Measuring System, which is hereby incorporated by reference in its entirety, discloses a system that accurately determines the vertical angle (i.e., elevation angle) from an appropriately equipped rotating laser transmitter to a laser receiver. The rotating laser system generally includes a rotating laser at a fixed location, with a photodetector at the target location. The photodetector periodically detects the rotating laser beam and generates a signal based upon receipt of the laser (i.e., when the laser beam strikes a photocell of the detector). In an advantageous embodiment, the transmitted laser beam comprises fan shaped beams in the shape of the letter N. The signal may be processed using various techniques in order to provide additional positioning/geometric information, such as the vertical angle between the photodetector and the laser transmitter.

The above described rotating laser system itself only measures the vertical angle between the photodetector and the laser transmitter, and does not measure the height of the target. Using well known geometry (as will be discussed in further detail below), given the vertical angle between the photodetector and the laser transmitter, the relative height of the photodetector and the laser transmitter can be determined if the horizontal separation distance between the laser transmitter and the photodetector is known. Since the absolute height of the laser transmitter is known, the absolute height of the target can be determined once the relative height of the photodetector and the laser transmitter is calculated.

The horizontal separation distance between the laser transmitter and the photodetector may be determined using GPS techniques. In fact, the two systems complement each other. As discussed above, GPS techniques can provide highly accurate horizontal measurements, but less accurate vertical measurements. On the other hand, the rotating laser system can provide highly accurate vertical angles, but can only provide accurate height measurements if the vertical angle is supplemented with sufficiently accurate horizontal measurements. As such, an advantageous combination of the two systems provides highly accurate positioning in both horizontal and vertical measurements. Such a combined system is described in further detail in the above referenced U.S. Patent Application Publication No. US2004/0125365 A1. As shown in the referenced Patent Application Publication, such a system may be used in combination with a survey pole for use in connection with accurate survey applications, and with an earthmoving machine for use in connection with accurate construction applications.

One issue with the known techniques is the expense and complication of obtaining the highly accurate horizontal position information so that the height of the target may be determined. While RTK systems can provide highly accurate horizontal positions, they are relatively expensive and technically complex to set up and operate. This expense and complexity is due in part to the requirement of a local base station in addition to the target receiver. Further expense results from the requirement of more complicated processing within the receivers in order to achieve the required accuracy.

BRIEF SUMMARY OF THE INVENTION

The inventors have recognized that, for certain applications, lower horizontal accuracy can be tolerated while still obtaining sufficiently accurate height information for the target. More particularly, if the vertical angle is relatively small, then even relatively large errors in the horizontal measurement will still only result in relatively small errors in the vertical measurement. These measurement characteristics can be exploited in order to provide necessary measurements while reducing cost and complexity. Once the required accuracy in the vertical height measurement is known, then the largest expected vertical angle may be evaluated in order to determine the horizontal accuracy required in order to achieve the required vertical measurement accuracy. Upon a determination of the required horizontal accuracy, appropriate processing hardware and software may be chosen in order to reduce cost and complexity. Such reduced cost and complexity may be realized by choosing processing hardware and software which computes horizontal distances to within a predetermined tolerance based at least in part on the largest expected maximum angle.

In one embodiment, the position of an apparatus moving along a surface may be determined by calculating a plurality of vertical angles between the apparatus and a known location while the apparatus is moving along the surface, where the vertical angles vary only within a range having a largest expected maximum angle. A plurality of horizontal distances between the apparatus and the known location are determined, each of the horizontal distances associated with one of the vertical angles. The horizontal distances are computed to within a predetermined tolerance based at least in part on the largest expected maximum angle. A plurality of heights of the apparatus are then determined using the plurality of vertical angles and associated horizontal distances. The cost and complexity of the processing and processing hardware may be reduced because the horizontal distances only need to be computed to within the predetermined tolerance.

In particular embodiments, the known location may be associated with a rotating laser which is used in conjunction with a photodetector at the target in order to determine the vertical angle. Further, the target may comprise a GPS receiver for use in determining the horizontal distance measurements. The GPS receiver may further utilize a differential GPS service system in its horizontal measurement calculations.

The present invention is useful in various applications in order to reduce the cost and complexity of the horizontal distance measurement processing and equipment. The principles of the invention are particularly useful in applications where the surface over which the target apparatus moves is a substantially level landform such that the vertical angles will vary within a small range and wherein the largest vertical angles will be relatively small. In various embodiments, the target apparatus may be, for example, an earthmoving machine or a handheld survey pole.

These and other advantages of the invention will be apparent to those of ordinary skill in the art by reference to the following detailed description and the accompanying drawings.

DETAILED DESCRIPTION

Figure 1:
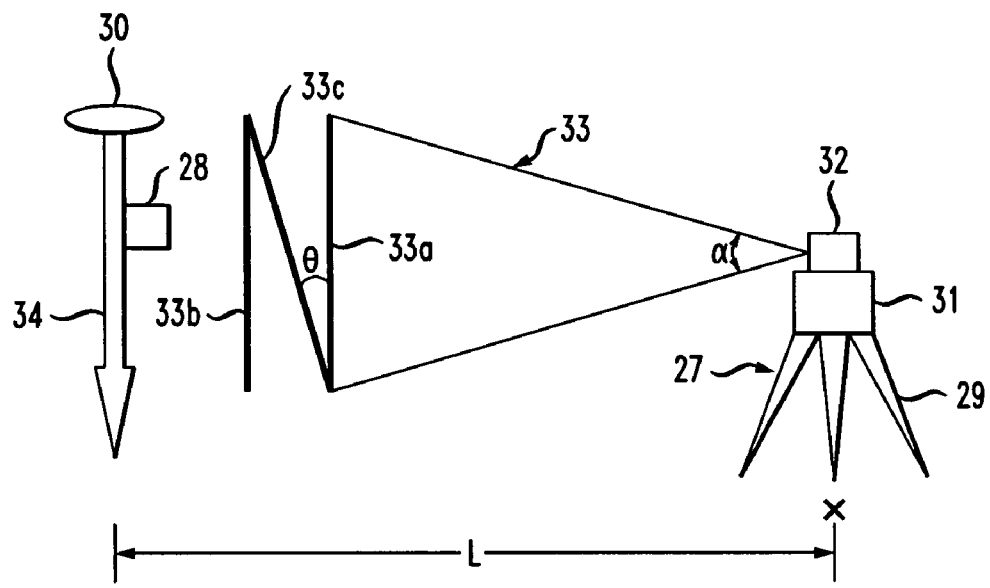
FIG. 1 shows a system including a survey pole and a rotating laser in which the principles of the present invention may be implemented.

One system in which the present invention has advantageous applicability is shown in FIG. 1. The system comprises a rotary laser device 27 for projecting a fan-shaped beam by rotary irradiation and a photodetection sensor device 28 for receiving the fan-shaped beam.

A tripod 29 is installed so that the tripod is aligned with a known point X, and the rotary laser device 27 is mounted on the tripod 29. The rotary laser device 27 comprises a main unit 31 and a rotator 32 rotatably mounted on the main unit 31. A laser beam 33 is projected by rotary irradiation from the rotator 32. The photodetection sensor device 28 is supported by a predetermined supporting means. FIG. 1 shows how the device is operated in field operation. The photodetection sensor device 28 is installed on a rod 34 (e.g., a survey rod), which can be manually carried by an operator. On an upper end of the rod 34, there is provided a GPS position measuring device 30. By using the GPS position measuring device 30, an absolute position on the ground can be measured based on a signal from a navigation satellite.

The laser beam 33 comprises a plurality of fan-shaped laser beams 33a and 33b in a vertical direction and a fan-shaped beam 33c tilted diagonally with respect to the fan-shaped beams 33a and 33b at an angle of θ, forming an N-shaped configuration. Also, the laser beams 33a and 33b are projected with a spreading angle α respectively.

Figure 2:
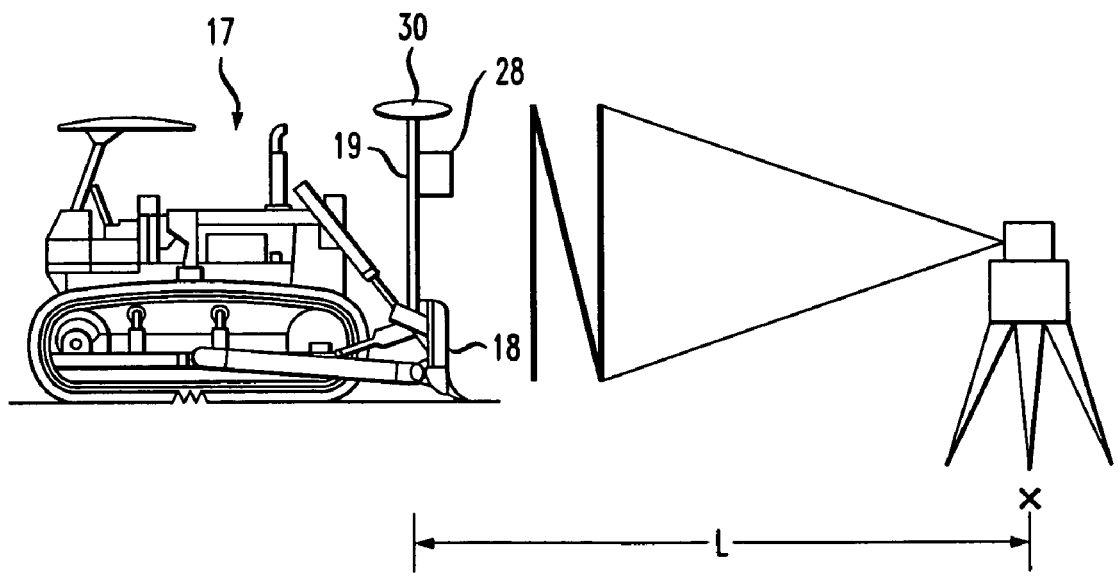
FIG. 2 shows a system including an earthmoving machine and a rotating laser in which the principles of the present invention may be implemented.

Another system in which the present invention has advantageous applicability is shown in FIG. 2. In FIG. 2 the photodetector device 28 is fixed on a working tool of a construction machine (e.g., on a blade 18 of a bulldozer 17). A mounting pole 19 is erected on the blade 18, and the photodetection sensor device 28 is mounted on the mounting pole 19, and a GPS position measuring device 30 is installed at an upper end of the mounting pole 19. The bulldozer 17 comprises an excavation operation control unit (not shown) such as a computer to control the operation of the blade 19.

In both the systems of FIGS. 1 and 2, the photodetection sensor device comprises a photodetection unit for receiving the fan-shaped beams and an arithmetic unit for calculating a vertical angle relative to the rotary laser device based on photodetection signals produced when the photodetection unit receives the light beam. The vertical angle produced by the photodetection sensor device may be used in conjunction with the GPS position measuring device to increase the accuracy of the position determination task.

Further details of the functioning of a rotating laser system of the type described herein in conjunction with FIGS. 1 and 2, and the determination of a vertical angle, may be found in the above referenced U.S. Patent Application Publication No. US2004/0125365 A1.

Figure 3:
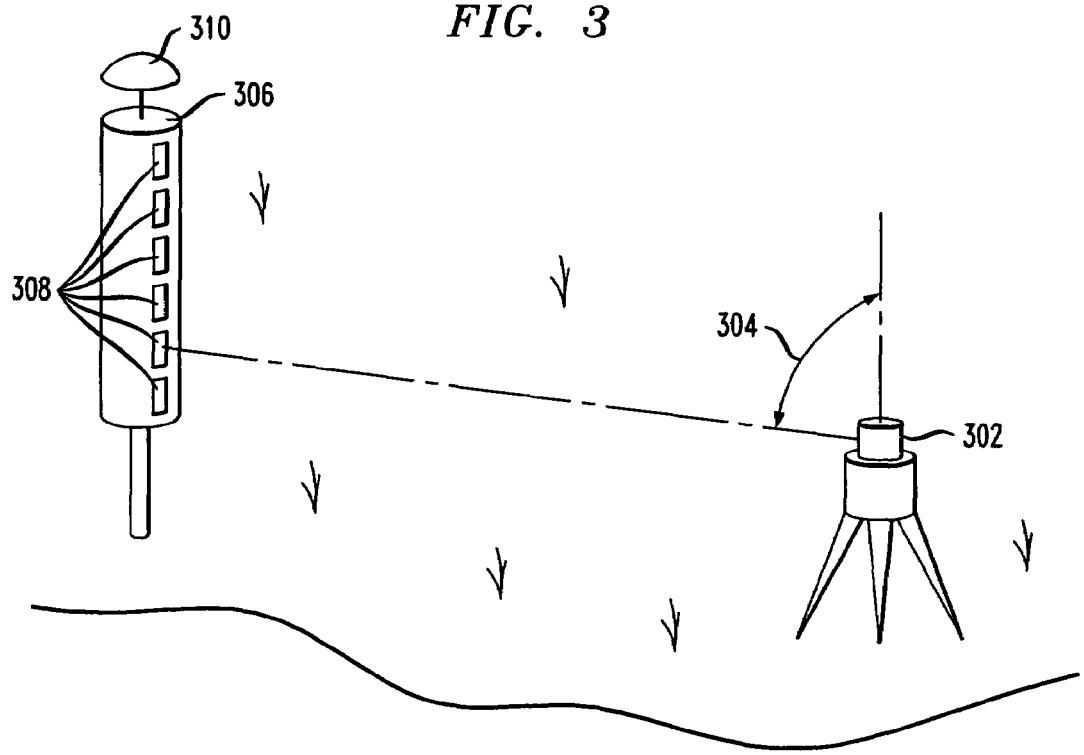
FIG. 3 shows a system including a plane laser system in which the principles of the present invention may be implemented.

In addition to the N-shaped configuration beam, other alternative means may be used in order to determine a vertical angle of a target relative to a known location. For example, FIG. 3 shows a plane laser system as one such alternative. FIG. 3 shows a laser transmitter 302 that transmits a plane laser at a known slope angle 304. The target device 306 has multiple photodetection sensors 308 for detecting the transmitted laser. The system can calculate the vertical angle of the transmitter relative to the target based upon which of the photodetection sensors 308 senses the laser and the known slope angle 304. As in the embodiments described in connection with FIGS. 1 and 2, the target device 306 may also include a GPS position measuring device 310 for determining an absolute position on the ground.

Figure 4:
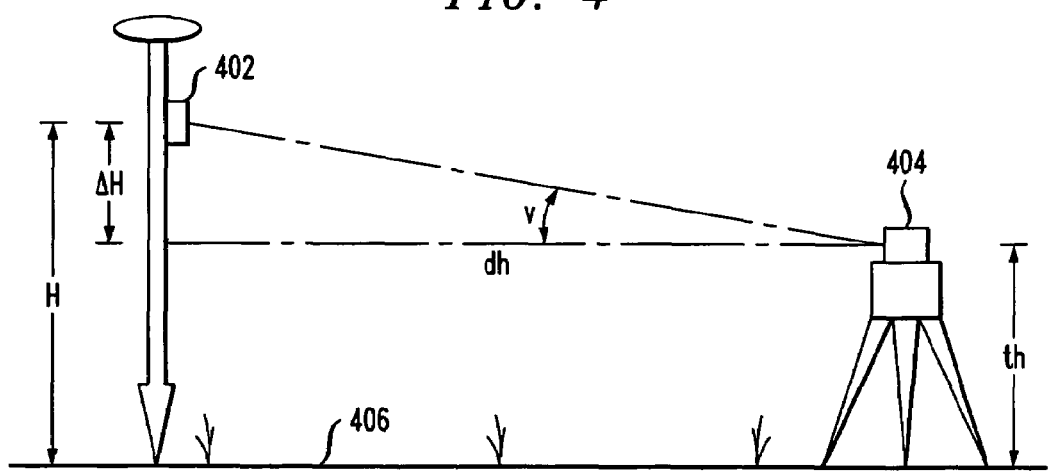
FIG. 4 illustrates the determination of the height of a target device relative to a known location given the vertical angle and horizontal distance (dh) between the target device and the known location.

The methods described above provide a vertical angle of the target relative to a known location as well as a horizontal distance between the target and the known location. Given this information, the height of the target may be determined using geometric relationships as follows. FIG. 4 illustrates the determination of the height of a target device 402 relative to a known location (which is shown in FIG. 4 as laser transmitter 404). Given vertical angle (v) and horizontal distance (dh), the relative height ($\Delta H$) may be determined by:

$$\Delta H = dh \times \tan(v) \quad (1)$$

Since the height (th) of transmitter 404 above the surface 406 is known, the absolute height (H) of target 402 may be determined by:

$$H = \Delta H + th \quad (2)$$

If the height H of target 402 needs to be determined with high accuracy, then an accurate distance measurement technique must be used to provide an accurate horizontal distance measurement. As described above in the background of the invention, one such accurate distance measurement technique is RTK GPS. An example of such a system is shown in FIGS. 14 and 15 of the above referenced U.S. Patent Application Publication No. US2004/0125365 A1. Those figures show a GPS base station antenna mounted directly over the turning axis of the rotating laser. While this type of system provides for highly accurate location of the target, along with the accuracy also comes the relative expensive and technical complexity of an RTK GPS system.

We have realized that less accurate horizontal measurements can be tolerated in certain applications and still provide acceptable height calculations. A benefit of this realization is that acceptable results may be obtained by using less expensive and/or less complex techniques for determining the horizontal measurements.

Analyzing the error in the $\Delta H$ value of equation (1) by taking first differentials provides the following:

$$d(\Delta H) = \tan(v) d(dh) + dh \sec^2(v) dv \quad (3)$$

From equation (3) it is seen that the error in $\Delta H$ is composed of two parts: 1) the error in the horizontal distance (d(dh)); and 2) the error in the vertical angle (dv). The first error term $\tan(v)d(dh)$ is controlled by the vertical angle and the error in the horizontal distance. The second error term $dh\sec^2(v)dv$ is controlled by the horizontal distance, vertical angle, and error in vertical angle.

As seen from equation (3), if the vertical angle and the vertical angle error are kept relatively small, then the error $\Delta H$ will also be relatively small, even given a relatively larger error in the horizontal distance measurement. As an example evaluation of equation (3), assume a maximum vertical angle (v) of approximately 5 degrees and a horizontal distance error (d(dh)) of approximately 3 cm. The first error term then evaluates to only 2.5 mm. The vertical angle measurement error (dv) should be limited to no more than 10 sec of arc over an operational distance of 300 m. Therefore, the second term evaluates to $$\frac{300 \times 1^2 \times 10}{206264.8} \approx 1.5 \text{ cm}$$

thereby giving a total relative height error d($\Delta H$) of 1.75 cm. At an operational distance of 100 m, the second error term is limited to ⅓ of the amount at 300 m, or approximately 5 mm, thereby giving a total relative height error d($\Delta H$) of 7.5 mm.

Thus, as seen from the above discussion, if the vertical angle (v) is relatively small, then even relatively large errors in the horizontal measurement will still only result in relatively small errors in the vertical measurement. In applications in which the vertical height is the important parameter, these measurement characteristics can be exploited in order to provide the necessary measurements while reducing cost and complexity. It should be recognized that various characteristics of the particular operating environment must be considered in order to determine the necessary accuracy. For example, different applications require different vertical height measurements. Once the required accuracy in the vertical measurement is known, then the largest expected vertical angle should be evaluated in order to determine the horizontal accuracy required (i.e., the required tolerance in the horizontal measurement) in order to achieve the required vertical measurement accuracy. The largest expected vertical angle may be determined by estimating the range within which the vertical angles will vary, and determining the largest vertical angle within that range. The least horizontal accuracy (i.e., the greatest allowable tolerance in the horizontal measurement) will be needed in those applications which both 1) do not require highly accurate vertical measurements; and 2) are expected to have small vertical angle measurements. The greatest horizontal accuracy (i.e., the smallest allowable tolerance in the horizontal measurement) will be needed in those applications which both 1) require highly accurate vertical measurements; and 2) are expected to have large vertical angle measurements. One skilled in the art will recognize that between these two ends of the spectrum, there is a need to balance the various system components depending upon the particular application. One skilled in the art could readily perform this balancing given the description herein. Upon a determination of the required accuracy, appropriate processing hardware and software may be chosen in order to reduce cost and complexity. Such reduced cost and complexity may be realized by choosing processing hardware and software which computes horizontal distances to within a predetermined tolerance based at least in part on the largest expected maximum angle.

One particular application in which the present invention is useful is in land leveling or slope control for agricultural purposes, where the work surface is relatively level. For example, consider the land leveling/slope control application shown in FIG. 5. The construction machine 502 is operating on a surface 504 which is relatively level, or only gently sloping. In such a situation, the photodetection sensor device 506 will only move within a small vertical distance range 508. If rotary laser device 510 is set up such that the laser transmitter 512 is vertically centered level with the midpoint of range 508, then the vertical angle between the photodetector 506 and the laser transmitter 512 will remain in a range of relatively small vertical angles. As such, the horizontal distance dh required to determine the height of the construction machine blade requires less accuracy. Further, in agricultural applications heighting errors of up to 2 cm can be tolerated because the soil formations generally cannot be controlled much more accurately than 2 cm. Given the above characteristics of agricultural applications, it is seen that acceptable results may be obtained without the need for highly accurate horizontal measurements. Given the above equations, it is seen that a 10 cm error in horizontal distance contributes less than 1 mm of error for a vertical angle of 0.5 degrees, and only 5 mm of error for a vertical angle of 3 degrees. Such precision is acceptable for applications such as land leveling and construction, respectively. Further, even a measurement system that can provide positioning accuracy of 50 cm or better may be used to provide height position accuracy to 2.5 cm or better for a 5% slope. Of course, land leveling is just one application in which the principles of the present invention may be advantageous. Other applications include, for example, quarries, where satellite blockage can be problematic. In addition, early "rough grading" for machine control is another example.

Additional exemplary vertical height measurement accuracy requirements, expected largest vertical angles, and associated horizontal measurement accuracy requirements are shown in the following table.

| APPLICATION | REQUIRED ACCURACY IN VERTICAL HEIGHT | EXPECTED LARGEST VERTICAL ANGLE | REQUIRED TOLERANCE IN HORIZONTAL MEASUREMENT |
|---|---|---|---|
| Agricultural land leveling | +/−1.5 cm | 2 degrees | 0.43 m |
| Paving/Profiling | +/−0.3 cm | 10 degrees | 1.5 cm |
| Steep slopes | +/−3.0 cm | 45 degrees | 3.0 cm |
| Rough grading | +/−1.5 cm | 10 degrees | 8.5 cm |

Figure 6:
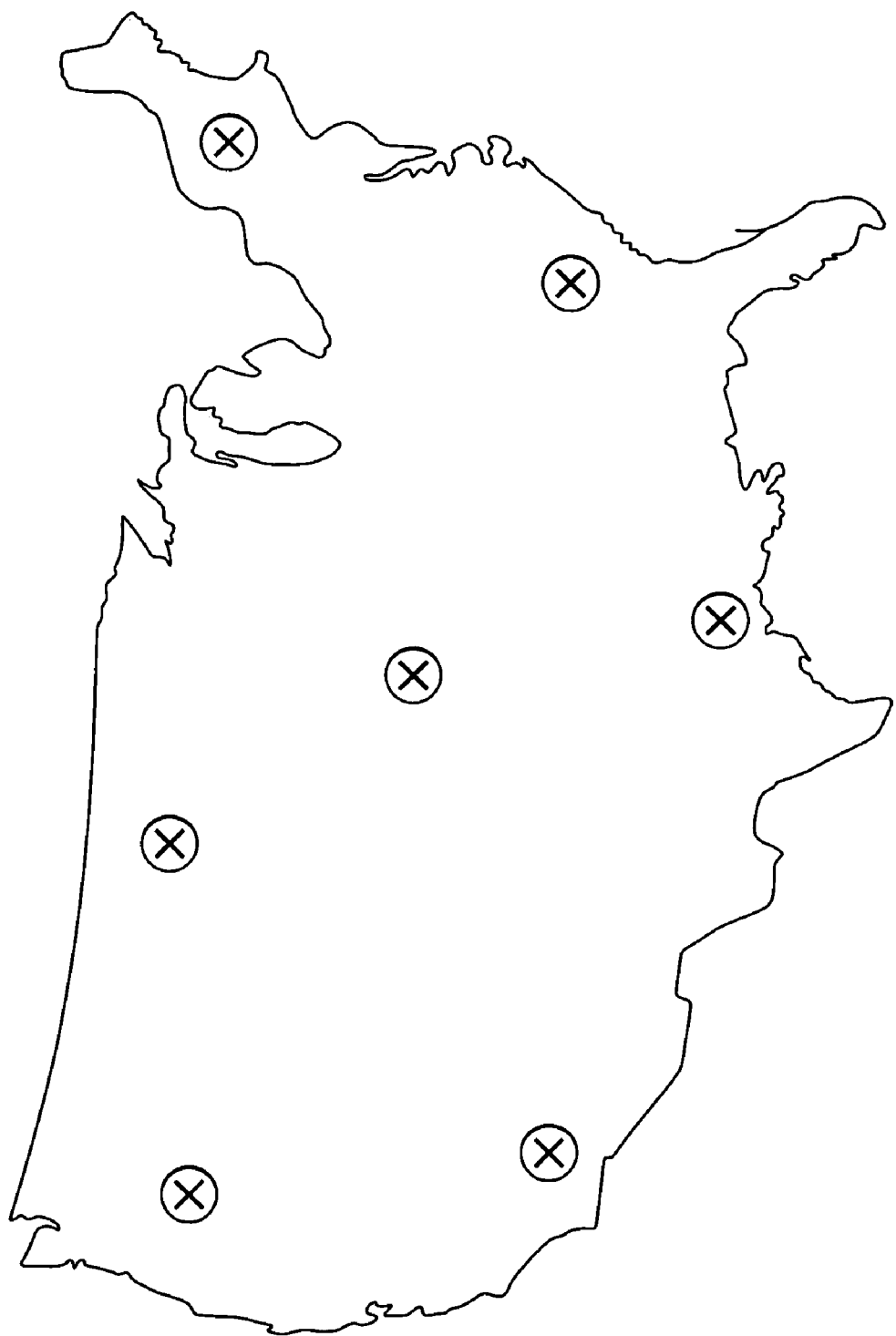
FIG. 6 shows an exemplary continental distribution of differential GPS base stations which make up a differential GPS service system.

One skilled in the art will recognize that there are various GPS systems available for providing the horizontal distance measurement to the required accuracy. For example, there are various types of GPS receivers and processing software available, with various accuracy capabilities. In general, the lower the accuracy the lower the cost and complexity. Therefore, in accordance with the principles of the invention, lower cost units may be used where the horizontal measurement accuracy requirements are low. In one embodiment, rather than using a highly accurate RTK GPS system, a differential GPS service system is used for the horizontal distance calculation. A differential GPS service system is a system of relatively widely dispersed differential GPS base stations which may be shared by multiple end users to assist in GPS positioning calculations. These base stations are generally much farther away from the target rover GPS receiver than would be the case in a typical GPS RTK system. As an example, an exemplary continental distribution of differential GPS base stations which make up a differential GPS service system is shown in FIG. 6, where base stations are shown by encircled x's. The operational range of a typical GPS RTK base station is approximately 1 km or less, while the operational range of a typical base station in a differential GPS service system is approximately 100 km or more.

The benefit to an end user is that the end user can use one or more of the base stations of the differential GPS service system in calculating the location of the user's rover receiver, without the expense or complexity of the user setting up his/her own GPS base station. The greater distance between the rover GPS receiver and base GPS receiver results in less accuracy in the horizontal distance measurements. However, due to our recognitions described above, we have realized that for certain applications, such reduced horizontal distance accuracy is acceptable, and therefore the use of a differential GPS service system is advantageous in terms of cost and complexity, while still providing acceptable accuracy. Assuming an error of approximately one part per million using existing differential GPS techniques, the following table shows the maximum distance that a differential GPS receiver may be placed from a base station in order to achieve the required horizontal distance measurement accuracies for the exemplary applications shown in the table above. Thus, the following table adds an additional column to that table as follows:

| APPLICATION | REQUIRED ACCURACY IN VERTICAL HEIGHT | EXPECTED LARGEST VERTICAL ANGLE | REQUIRED TOLERANCE IN HORIZONTAL MEASUREMENT | MAXIMUM DISTANCE FROM GPS BASE STATION |
|---|---|---|---|---|
| Agricultural land leveling | +/−1.5 cm | 2 degrees | 0.43 m | 434 km |
| Paving/Profiling | +/−0.3 cm | 10 degrees | 1.5 cm | 16 km |
| Steep slopes | +/−3.0 cm | 45 degrees | 3.0 cm | 30 km |
| Rough grading | +/−1.5 cm | 10 degrees | 8.5 cm | 85 km |

There are several well known differential GPS service systems currently operational. For example, the GPS Beacon system (operated by the US Coast Guard), the Wide Area Augmentation System (WAAS) operated by the FAA, and the Omni STAR system operated by the Fugro company. One of the distinguishing elements of these systems is that their use does not require a nearby base station to be part of the GPS setup, thus eliminating one of the major cost considerations and the burden of setting up the base station and providing a precise position for it. Of course, for those applications which require very precise positioning (e.g., approximately at the level of 1 cm), the additional cost and effort of setting up a dedicated GPS receiver base station is required to obtain the necessary precision. However, we have recognized that for certain applications this effort and cost are not needed for the required results.

In yet another embodiment, a satellite-based GPS service may be used in order to determine the horizontal distance between the target and the known location. In such a system a reference base station is not used. Here, in a global system such as GPS, GLONASS or Galileo, one needs to know satellite positioning and clock states with sufficiently precise estimates so that precisions approaching 1 meter in user position, and therefore horizontal distances, are possible.

Using the known location of the laser transmitter, the differential GPS service system is used to determine the horizontal distance between laser transmitter and the corresponding receiver. This is done by attaching an appropriate GPS receiver (i.e., a GPS receiver configured to operate in conjunction with the differential GPS service system) above the appropriate laser receiver. The differential GPS service system provides the needed horizontal coordinates having better than 10 cm accuracy for the receiver, and these coordinates along with the known coordinates of the laser transmitter, allow for the computation of horizontal distance from the laser transmitter to the corresponding laser receiver with an accuracy of at least 10 cm. From the discussion above, we see that a 10 cm error in horizontal distance is acceptable for certain applications, such as land leveling and construction respectively.

Figure 5:
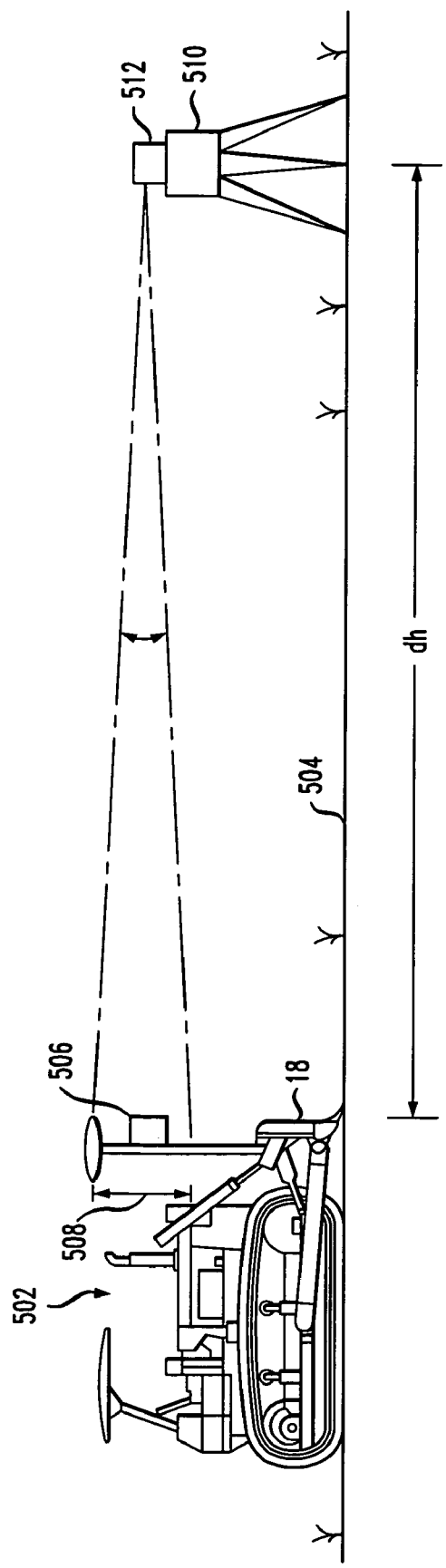
FIG. 5 illustrates a land leveling/slope control application in which the principles of the present invention may be implemented.

With reference to FIG. 5, in operation, an embodiment of the present invention can determine the location of an apparatus (e.g., machine 502) moving along a surface 504 by determining vertical angles between the machine and a known location (e.g., the location of the rotary laser device 510) during the time period the machine 502 is moving along the surface 504. The particular advantages described above may be realized if the vertical angles remain relatively small and vary only within a small range. At the time when each of the vertical angles are determined, a horizontal distance between the machine 502 and the rotary laser device 510 is also determined. Since the vertical angle is known to remain small, the horizontal distance may be determined to within a relatively large tolerance (or to a tolerance larger than a particular value), thus reducing the cost of the horizontal measurement equipment. Using the measured vertical angles and associated horizontal distances, the height of the apparatus (or part of the apparatus) may be determined at each of the measurement times.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, multiple laser transmitters may be used to provide additional height information. Further, multiple laser transmitters may be placed along a length of a work surface in order to reduce the horizontal distance between the laser transmitter and the laser receiver. In addition, earth curvature may be taken into account in order to increase the accuracy of the position determination.

What is claimed is:

1. A method for determining the position of an apparatus moving along a surface comprising the steps of:
    determining a plurality of vertical angles between said apparatus and a known location during a time period during which said apparatus is moving along said surface, said vertical angles varying within a range having a largest expected maximum angle;
    determining a plurality of horizontal distances between said apparatus and said known location, each of said horizontal distances associated with one of said vertical angles and computed at substantially the same time, said horizontal distances computed to within a predetermined tolerance based at least in part on said largest expected maximum angle; and
    determining a plurality of heights of said apparatus using said plurality of vertical angles and associated horizontal distances.

2. The method of claim 1 wherein said tolerance is further based upon a required accuracy of said plurality of heights.

3. The method of claim 2 wherein said apparatus is performing agricultural land leveling wherein:
    said required accuracy of said plurality of heights is approximately +/−1.5 cm;
    said largest expected maximum angle is approximately 2 degrees; and,
    said predetermined tolerance is approximately 0.43 m.

4. The method of claim 2 wherein said apparatus is performing paving wherein:
    said required accuracy of said plurality of heights is approximately +/−0.3 cm;
    said largest expected maximum angle is approximately 10 degrees; and,
    said predetermined tolerance is approximately 1.5 cm.

5. The method of claim 2 wherein said apparatus is performing profiling wherein:
    said required accuracy of said plurality of heights is approximately +/−0.3 cm;
    said largest expected maximum angle is approximately 10 degrees; and,
    said predetermined tolerance is approximately 1.5 cm.

6. The method of claim 2 wherein said apparatus is performing slope control wherein:
    said required accuracy of said plurality of heights is approximately +/−3.0 cm;
    said largest expected maximum angle is approximately 45 degrees; and,
    said predetermined tolerance is approximately 3.0 cm.

7. The method of claim 2 wherein said apparatus is performing rough grading wherein:
    said required accuracy of said plurality of heights is approximately +/−1.5 cm;
    said largest expected maximum angle is approximately 10 degrees; and,
    said predetermined tolerance is approximately 8.5 cm.

8. The method of claim 1 wherein said step of determining a plurality of horizontal distances further comprises the step of determining said distances using a differential GPS service system.

9. The method of claim 1 wherein said apparatus is an earthmoving machine.

10. The method of claim 1 wherein said apparatus is a survey pole.

11. The method of claim 1 wherein said known location comprises a rotating laser.

12. A system comprising:
   a rotating laser at a known position;
   an apparatus moving along a surface;
   means for determining a plurality of vertical angles between said apparatus and said rotating laser during a time period during which said apparatus is moving along said surface, said vertical angles varying within a range having a largest expected maximum angle;
   means for determining a plurality of horizontal distances between said apparatus and said rotating laser, each of said horizontal distances associated with one of said vertical angles and computed at substantially the same time, said horizontal distances computed to within a predetermined tolerance based at least in part on said largest expected maximum angle; and
   means for determining a plurality of heights of said apparatus using said plurality of vertical angles and associated horizontal distances.

13. The system of claim 12 wherein said means for determining a plurality of vertical angles comprises a photodetector attached to said apparatus.

14. The system of claim 12 wherein said means for determining a plurality of horizontal distances further comprises a GPS receiver.

15. The system of claim 14 wherein said GPS receiver utilizes a differential GPS service system.

16. The system of claim 12 wherein said apparatus is an earthmoving machine.

17. The system of claim 12 wherein said apparatus is a survey pole.

18. A system for determining the position of an apparatus moving along a surface comprising:
   means for determining a plurality of vertical angles between said apparatus and a known location during a time period during which said apparatus is moving along said surface, said vertical angles varying within a range having a largest expected maximum angle;
   means for determining a plurality of horizontal distances between said apparatus and said known location, each of said horizontal distances associated with one of said vertical angles and computed at substantially the same time, said horizontal distances computed to within a predetermined tolerance based at least in part on said largest expected maximum angle; and
   means for determining a plurality of heights of said apparatus using said plurality of vertical angles and associated horizontal distances.

19. The system of claim 18 wherein said means for determining a plurality of vertical angles comprises:
   a rotating laser at said known location; and
   a photodetector.

20. The system of claim 18 wherein said means for determining a plurality of horizontal distances comprises:
   a GPS receiver utilizing a differential GPS service system.

21. The system of claim 18 wherein said means for determining a plurality of vertical angles comprises:
   a plurality of rotating lasers; and
   a photodetector.

* * * * *